Jan. 16, 1940.   G. J. OESTREICHER   2,187,477
STOP VALVE
Filed March 14, 1938
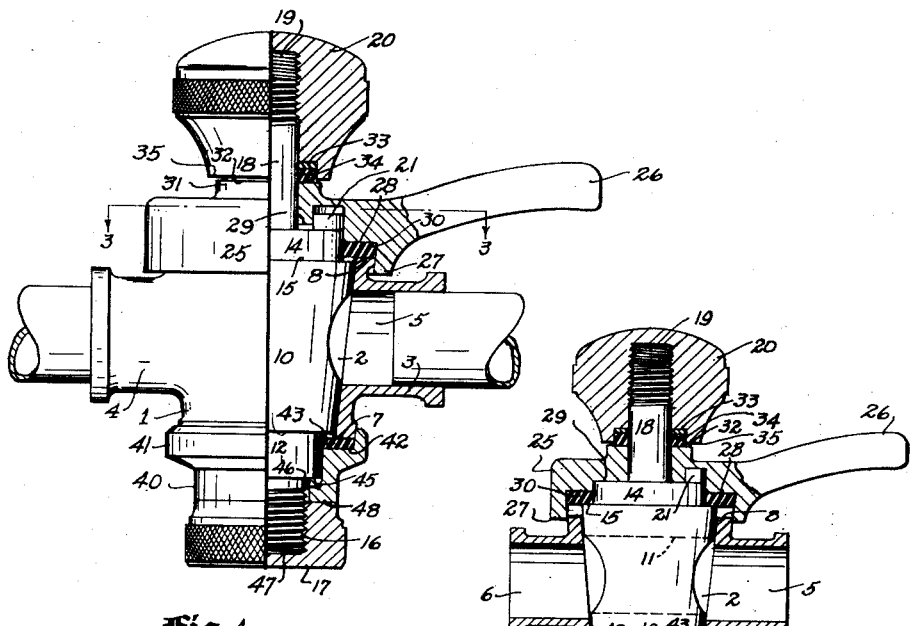
Fig.1
Fig.2
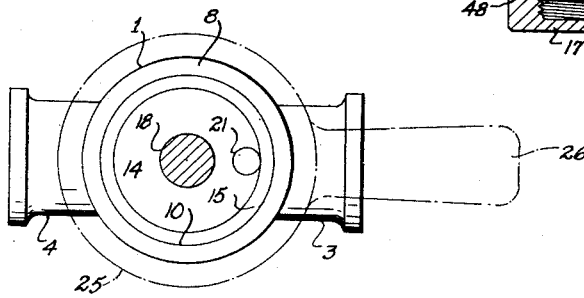
Fig.3
INVENTOR.
GEORGE J. OESTREICHER
BY John H. Leonard,
his ATTORNEY.

Patented Jan. 16, 1940

2,187,477

UNITED STATES PATENT OFFICE 2,187,477

STOP VALVE

George J. Oestreicher, Cleveland, Ohio

Application March 14, 1938, Serial No. 195,667

5 Claims. (Cl. 251—97)

This invention relates to stop valves, and particularly to a rotatable plug valve for use in connection with sanitary pipe lines such as the pipe lines of dairies, breweries and the like. For purposes of illustration, the invention will be described in connection with a milk line for dairies, its use in connection with other pipe lines being readily apparent therefrom.

The valves heretofore provided for dairy pipe lines comprise a body having a valve plug receiving bore which is open at the ends. The valve plug is disposed in the bore and, at its lower end, has an internally threaded axial bore for receiving a wing screw. A suitable closure plate, provided with an aperture through which the wing screw may pass, is disposed over the lower end of the valve body, and the wing screw is passed therethrough and tightened to draw the plug firmly into seating position in the bore of the valve body. The top of the valve body is closed by a suitable radial flange on the upper end of the plug. Ordinarily, such plugs and bores are tapered complementarily so as to seal more effectively. Likewise, the plug is provided with an integral handle for rotating the same.

In actual use, the prior valve plugs become jammed in the bore and cannot be removed, as contemplated, merely by loosening the wing nut and lifting the plug. Consequently, the workman usually strikes the lower end of the plug with a hammer or other tool in order to loosen it, or, if this fails, strikes the handle. In either event, damage to and breakage of the plug results. If the plug is loosened in this manner, there is a considerable loss of milk by leakage around the outside of the plug and through the ends of the plug receiving bore of the body before the plug is rotated and re-seated. None of the valves now provided for such lines can be tightened firmly by hand in either open or closed position and loosened and rotated readily by hand to the desired different positions while at the same time the ends of the plug receiving bore of the body are sealed.

One of the principal objects of the present invention is to provide a valve for use in sanitary lines in which the plug may be positively seated or drawn tightly to the seated position by hand and without the use of any tools, and which, when so operated, prevents any leakage whatever around the plug or between the plug and valve body.

Another object is to provide a valve in which the plug may readily be loosened by hand preparatory to rotation and rotated by hand to different positions.

Another object is to provide a rotatable plug valve for the purposes described which is simple in construction and of which the parts are so arranged that they may readily be disassembled for purposes of cleaning and are shaped that they may be cleaned easily when disassembled.

Other objects and advantages will become apparent from the following specification, wherein reference is made to the drawing, in which:

Fig. 1 is a side elevation of a valve embodying the principles of the present invention, part thereof being shown in section for clearness of illustration;

Fig. 2 is a reduced longitudinal sectional view of the valve illustrated in Fig. 1, showing the valve plug in loosened condition prior to rotation; and Fig. 3 is a top plan view of the valve with the head jam nut and cover removed, and is taken on a plane indicated by the line 3—3 in Fig. 1.

Referring to the drawing, the valve comprises a hollow body 1 having a central tapered axial bore 2 opening through the upper and lower ends of the body 1. The body has attachment portions 3 and 4 having passages 5 and 6, respectively, one of which passages comprises an inlet passage to the central bore, and the other of which comprises an outlet passage. At its lower end, the body has a flat, annular shoulder portion 7, and a corresponding shoulder 8 is provided at the upper end of the body. Mounted within the body in the central bore 2 is a valve plug 10 having a diametral passage 11 therethrough which is arranged to connect with the passages 5 and 6 in one rotated position of the plug 10. The plug 10 is tapered from its upper or head end toward its lower or tail end so as to fit in sealing relation with the wall of the bore 2. At its lower end, the plug has a tail portion 12 which is coaxial with and of less diameter than the smaller end of the plug 10, so that the outer radial margin of the lower end of the plug 10 is in the form of a sealing shoulder 13. Correspondingly, at the larger or head end of the plug 10 is a head portion 14 which is of less diameter than the larger end of the plug, so that the outer radial margin of the larger end of the plug is in the form of a sealing shoulder 15.

Extending from the tail portion 12 is a threaded end portion 16 arranged to receive an internally threaded tail jam nut 17, later to be described. Extending in the opposite direction and from the head portion 14 is a stem 18, the upper end of which is threaded, as indicated at 19, for receiving an internally threaded head jam nut 20, later to be described. Likewise extending upwardly from the portion 14 is a lug 21 which is rigid with the plug and eccentric to the stem. The plug 10 is preferably of slightly less length than the length of the bore 2 so that when the plug is seated, the shoulder 15 of the plug is slightly inwardly, endwise of the plug, from the shoulder 8 of the body. The shoulder 13 of the plug is correspondingly related to the shoulder 7 of the body. If desired, however, the shoulders 8 and 15 may be positioned to lie in the same plane when the plug is seated.

In order to rotate the plug and for cooperating therewith and with the body for sealing the upper end of the bore 10 is a head cap 25 having an operating handle 26 integral therewith. The head cap 25 is counterbored from the face disposed toward the valve body so as to provide an annular flange portion 27 which snugly embraces the upper end portion of the body 1 and a shoulder 28 which extends radially of the head portion a distance such that when the cap is installed, the shoulder 28 is coextensive radially of the valve body with the shoulders 15 and 8 of the plug and body, respectively. Inwardly from the shoulder 28, the cap has a central counterbore 29 which snugly accommodates the head portion 14 of the valve plug, and has a recess for receiving the lug 21 for connecting the cap and plug 10 for rotation together.

Interposed between the shoulder 28 of the cap and the shoulders 15 and 8 of the plug and body, respectively, is a resilient washer 30, which may be of rubber, or of the paper or fiber type which is customarily employed in sanitary lines. The cap 25 has a central passage through which the stem 18 of the valve plug extends and has an upwardly extending portion 31 which is coaxial with the stem, and the upper end of which provides an abutment shoulder 32.

The head jam nut 20 is provided at the face toward the cap 25 with a recess which receives a rigid slip washer 33 and a resilient washer 34, the resilient washer being positioned to engage the shoulder 32 of the portion 31. The marginal portion of the head jam nut 20 is arranged so that upon slight compression of the washer 34, the lower end 35 thereof engages the shoulder 32 of the cap. Consequently, if the nut is screwed toward the plug, the washer 34 is first confined from outward radial expansion and compressed and caused to engage tightly about the stem 18. Continued screwing of the nut 20 toward the plug causes engagement of the shoulder 35 of the nut with the shoulder 32 of the cap, thus drawing the plug toward the cap. Obviously, if the lower end of the plug is anchored so that it cannot move during this operation, the cap 25 is forced firmly toward the plug and compresses the washer 30. Since the washer 30 is also confined from outward radial expansion by the cap 25, it forms a seal between the circumferential wall of the head portion 14 and the washer 30 and also between the shoulder 8 of the body 1 and the shoulder 28 of the cap, thus effectively sealing the upper end of the body bore. Due to the provision of the washer 33, the nut may rotate readily, unconstrained by frictional engagement with the rubber washer 34. Both the washer 34 and the washer 30 are of such internal diameter as to fit relatively snugly about the stem 18 and head portion 14, respectively, prior to compression.

In order to provide a corresponding seal at the opposite end of the valve body 1, a tail cap 40 is provided. The tail cap 40 is counterbored with a number of offset counterbores so as to provide a radial flange portion 41 which embraces the lower end of the valve body. The cap 40 has a shoulder 42 which corresponds in operation to the shoulder 28 of the cap 25. The cap 40 is arranged to engage and compress a washer 43 while constraining the washer 43 from outward radial expansion, thus forming an effective seal at the lower end of the valve body and plug and also around the tail portion 12.

The tail cap 40 has a central bore 47 which is internally threaded and accommodates the tail end portion 16 of the plug, this end portion extending axially of the plug beyond the outer face of the tail cap 40. The tail jam nut 17 is internally threaded to cooperate with the threaded end portion 16 of the plug and to engage the lower face 48 of the tail cap 40.

Thus, when the tail jam nut 17 is screwed onto the plug, the nut engages the shoulder 48 of the cap 40 and first forces the tail toward the valve body, compressing the washer 43, and thereafter, upon continued screwing of the nut 17 toward the plug, it draws the plug more firmly into the bore 2 of the body. Thus, in addition to the sealing effect of the plug, the body is sealed at both ends of the bore 2. When it is desired to rotate the plug to a different position, the nut 17 may be loosened a slight amount, but not sufficiently to permit leakage around the washer 43. Next, the nut 20 is screwed toward the plug so as to lift the plug the amount afforded by the loosening of the nut 17. The nut 20 may then be loosened slightly after it has broken the plug loose from the bore, whereupon the plug may readily be rotated. Both of these operations may be performed while maintaining the washers 30, 34 and 42 in sealing relation with the valve plug and body. Each of the nuts 17 and 20 is sufficiently heavy and large so that it can be rotated readily by hand for effecting the operations described. As a result, the plug may be so loose in the bore 2 that it can be rotated without the slightest effort, and yet leakage cannot occur around the ends of the plug or out of the ends of the valve body. Furthermore, as is apparent from the description, the entire valve may readily be disassembled for cleaning merely by removing the nuts 17 and 20 and then disassembling the other parts. Usually, in removing the head cap 25 and the tail cap 40, the washers 30 and 42 remain on the head portions 14 and 12, respectively, of the valve plug and are thus pulled out of the head cap 25 and the tail cap 40. When so unconfined outwardly, the washers may readily be pulled off of the plug and replaced or cleaned and re-used, as desired. They adhere to the plug sufficiently tightly, however, to prevent dropping off from the plug accidentally.

Having thus described my invention, I claim:

1. A stop valve comprising a body having an inlet passage, an outlet passage, and a plug receiving bore which is open at both ends, a valve plug received in said bore from one end and having head and tail portions at its ends, caps for the ends of the body, respectively, and having shoulders facing toward the ends of the body, respectively, compressible washers received between the caps and the ends of the body, respectively, said washers embracing the said plug portions, respectively, said plug having threaded portions extending outwardly of the body beyond the caps endwise of the plug, respectively, and jam nuts in threaded engagement with the said extending ends of the plug and engaging said caps, respectively, and operable for moving the caps relatively toward each other when the jam nuts are screwed toward each other.

2. A valve comprising a body having an inlet passage, an outlet passage, and a valve plug receiving bore which is open at both ends, a rotatable valve plug in said bore, detachable caps received on the ends of the body and having shoulder portions facing toward the ends of the body, respectively, compressible washers received between the shoulder of the caps and the corresponding ends of the body, respectively, said plug having threaded portions extending outwardly of the body beyond the caps endwise of the plug, jam nuts in threaded engagement with the extending ends of the plug and engaging said caps for moving the caps relatively toward each other when the jam nuts are screwed toward each other, one of said caps being rotatable relative to the body and having a handle, means carried on the plug and cooperating means on said rotatable cap for connecting the plug and cap for rotation together.

3. A valve comprising a body having an inlet passage, an outlet passage and a valve plug receiving bore which is open at both ends, a rotatable valve plug received in said bore, detachable caps received on the ends of the body, compressible washers received between the caps and the ends of the body, respectively, said plug having threaded portions at its ends extending outwardly of the body beyond the caps endwise of the plug, jam nuts in threaded engagement with the extending threaded portions of the plug and engaging said caps for moving the caps relatively toward each other when the jam nuts are screwed toward each other, one of said caps having a handle and having a shoulder facing away from the plug, the nut associated with said cap having a cavity facing toward said shoulder, a resilient washer accommodated in said cavity and engageable with the said shoulder, and said last mentioned nut having a shoulder engageable with the shoulder on the cap when the nut is moved toward the cap a sufficient distance to compress said washer slightly.

4. A valve of the class described comprising a body with inlet and outlet passages intercepted by a tapered circular bore which carries a rotatable plug adapted to effect communication and discommunication of the passages, a handle member at one end of the plug having a portion encircling the same and movable relative to the plug axially thereof and arranged operatively to abut a face of the body adjacent one end of the bore, said handle member being connected to the plug in a manner to turn the plug, the plug having a threaded extension beyond said handle member portion from the plug, a threaded abutment device on said extension engaging the threads thereof and adjustable on said threads while reacting against the handle to move the plug toward the handle member for breaking the same from contact with the body independently of turning motion of the handle, and means acting on the plug normally to maintain the same seated in the tapered bore.

5. A valve of the class described comprising a body with inlet and outlet passages intercepted by a circular tapered bore which carries a rotatable plug adapted to effect communication and discommunication of the passages, a handle member at one end of the plug having a portion encircling the same and movable relative to the plug axially thereof and arranged operatively to abut a face of the body adjacent one end of the bore, said handle member being connected to the plug in a manner to turn the plug, the plug having threaded extensions, one beyond said handle member portion from the plug and one beyond the end of the bore opposite said portion, and threaded abutment devices on said extensions engaging the threads thereof, one of said devices being adjustable on the threads with which associated while reacting on the body to move the plug in one direction, and the other device being adjustable on the threads with which associated while reacting against the handle member portion in a direction toward the body to move the plug in the opposite direction.

GEORGE J. OESTREICHER.